United States Patent [19]

Jackson et al.

[11] 4,341,119

[45] Jul. 27, 1982

[54] DATA INPUT SYSTEM FOR DYNAMIC BALANCING MACHINE

[75] Inventors: Bernie F. Jackson, Los Gatos; Hoyt H. Nelson, Santa Clara, both of Calif.

[73] Assignee: Nortron Corporation, Sunnyvale, Calif.

[21] Appl. No.: 130,083

[22] Filed: Mar. 18, 1980

[51] Int. Cl.³ .............................................. G01M 1/22
[52] U.S. Cl. ......................................... 73/462; 73/487
[58] Field of Search ........................ 73/462, 463–466, 73/487, 459

[56] References Cited

U.S. PATENT DOCUMENTS 3,661,016  5/1972  Dopp .................................. 72/462
3,741,016  6/1973  Hofmann ............................ 73/462

FOREIGN PATENT DOCUMENTS 2639384 10/1977 Fed. Rep. of Germany .
1132136 10/1968 United Kingdom .

*Primary Examiner*—James J. Gill
*Attorney, Agent, or Firm*—Allegretti, Newitt, Witcoff & McAndrews Ltd.

[57] ABSTRACT

For a dynamic balancing machine the values of parameters employed to determine the weight, rim spacing and diameter of a wheel are automatically entered into the balancing machine by a single maneuver of an extensible wand. This simplicity eliminates many opportunities for human error when obtaining the same information otherwise.

11 Claims, 9 Drawing Figures

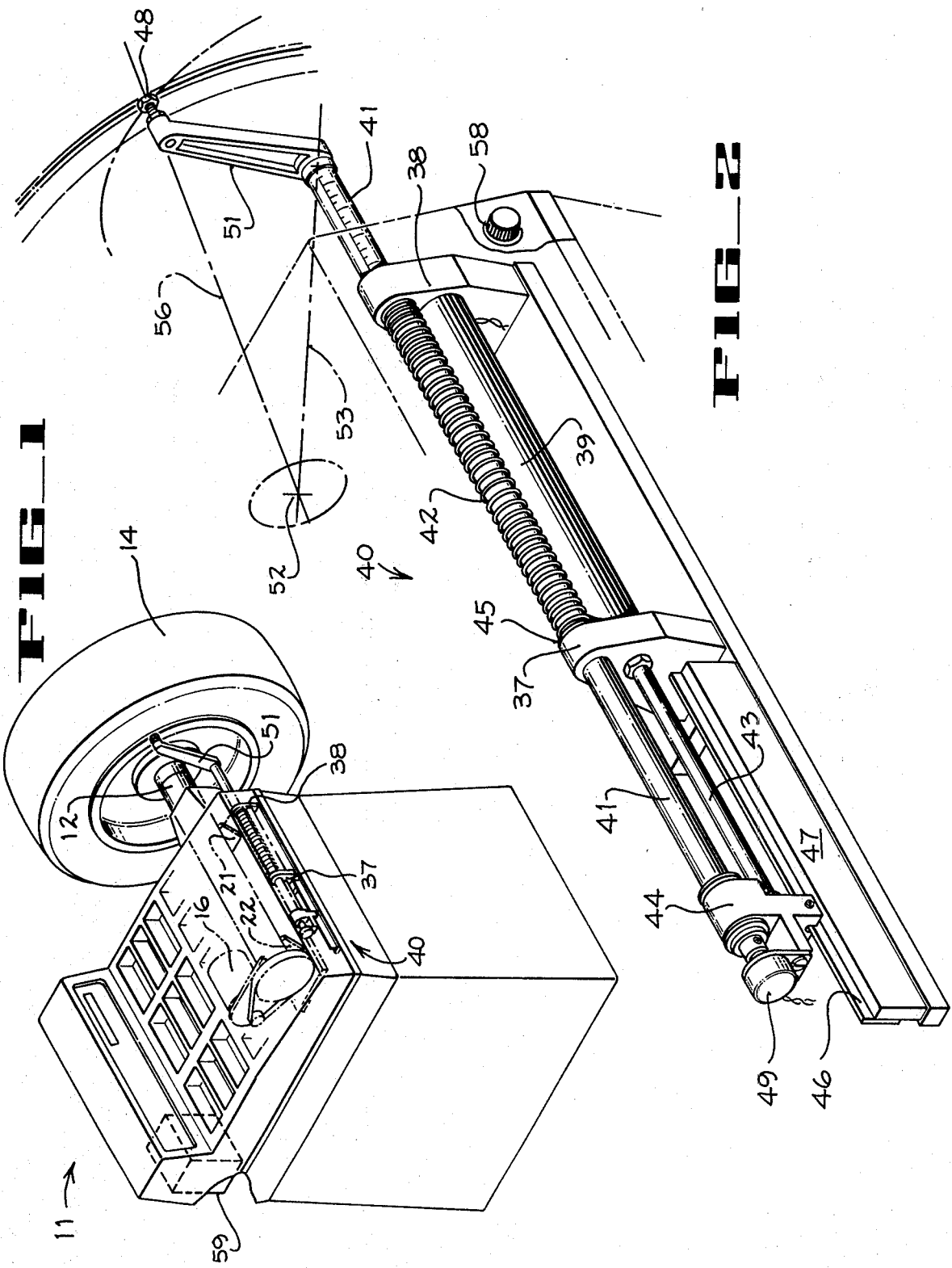

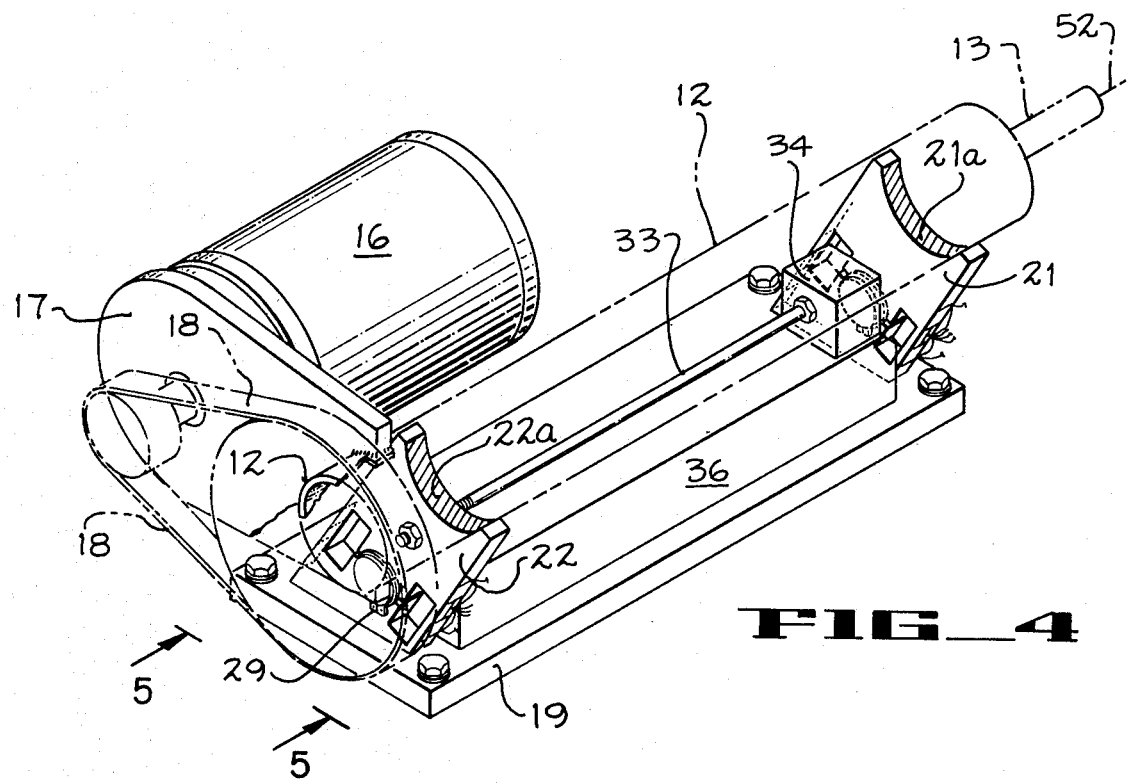
FIG_4
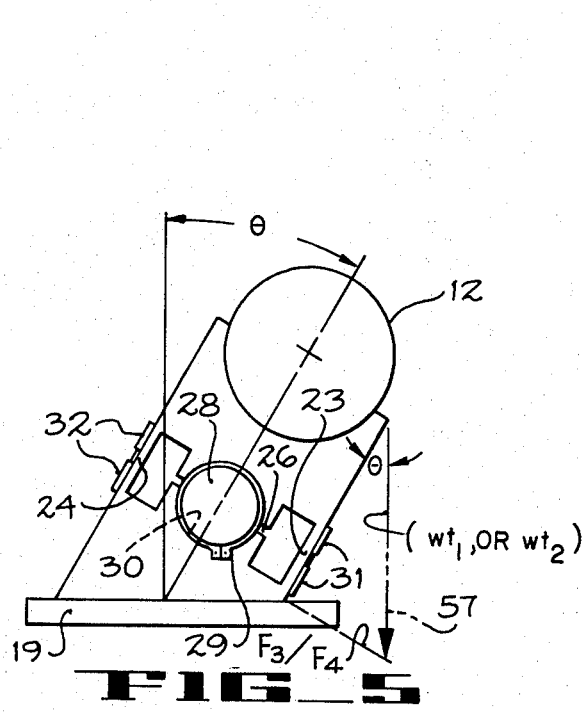
FIG_5
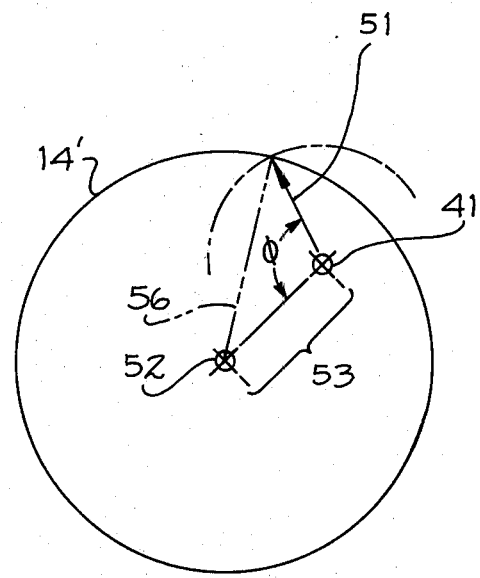
FIG_3

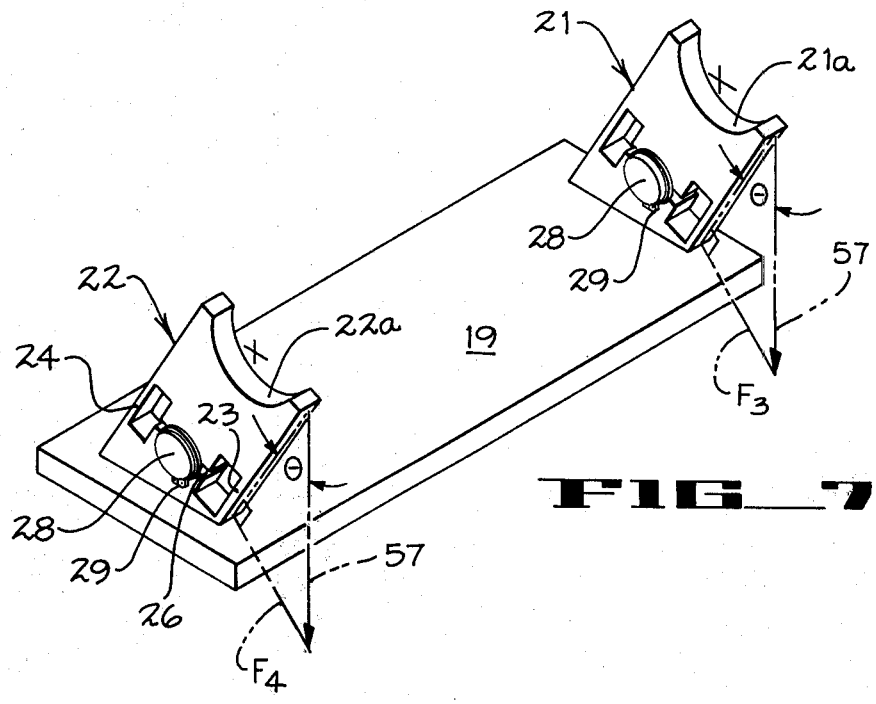
FIG_7
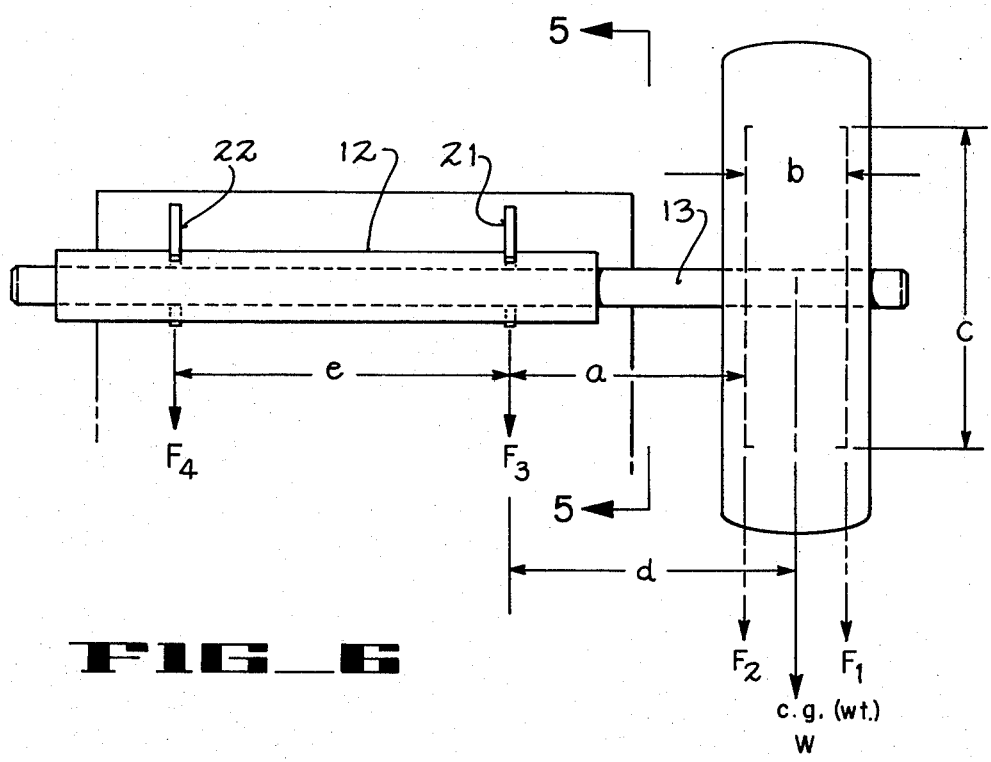
FIG_6

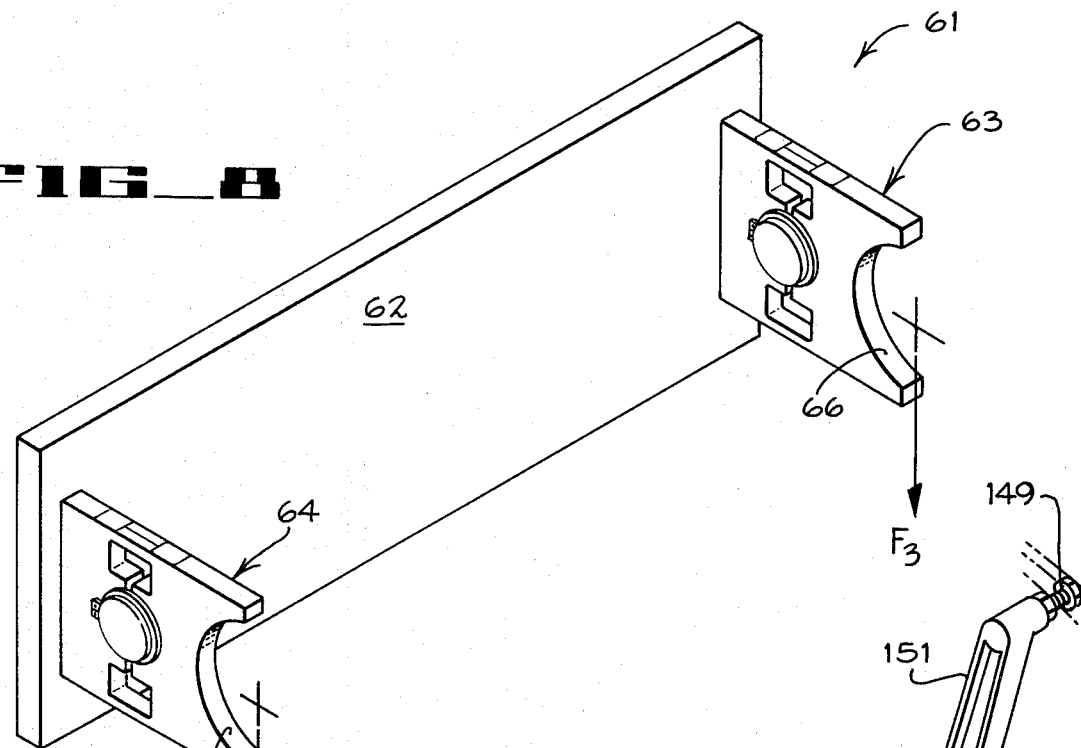
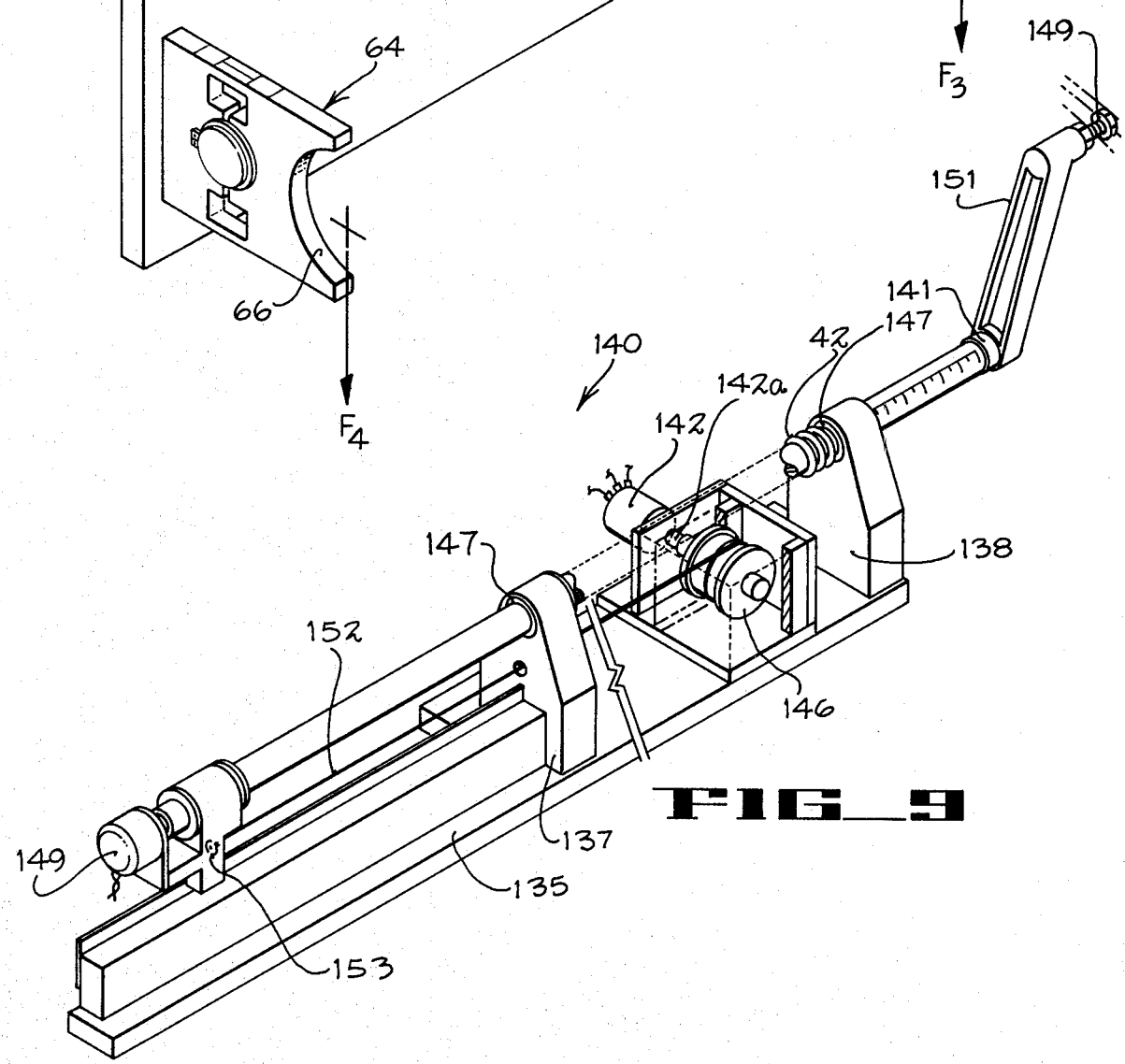

DATA INPUT SYSTEM FOR DYNAMIC BALANCING MACHINE

BACKGROUND OF THE INVENTION

This invention pertains to balancing machines and more particularly to a dynamic balancing machine having means for automatic entry of balancing parameters particularly useful in balancing vehicle wheels.

According to one electronic wheel balancing machine, spaced parallel upright support brackets carry an elongate cylindrical bearing housing. A driveshaft within the housing supports a wheel on one end and drive means on the other. As an unbalanced wheel is rotated, forces act upon sensing means carried by the brackets. Information from the sensing means is used to compute the amount and location for weight to be added to balance the wheel. In a balancing arrangement of this kind, the values of certain input parameters have heretofore been manually measured and entered and hence subject to the usual human error.

Heretofore, at least three measurements have had to be made. Each measurement is then manually entered into the computing section of the machine by manipulation of an associated dial. This arrangement, accordingly, provides six stages where human error can occur.

SUMMARY OF THE INVENTION

As disclosed herein, means are provided for entering a number of these parameters in response to carrying out a single maneuver by the operator of the machine. Accordingly, by reducing the number of operations, human error becomes substantially reduced.

Further, the parameters thus entered are employed to calculate other parameters.

In general, in a dynamic balancing machine employing an elongate driveshaft for carrying a wheel on one end to be rotated therewith and an elongate bearing housing containing and supporting the shaft for rotation, an automatic data input device, as disclosed herein, enters data for calculating the value of balancing parameters. This device comprises means carried by the machine to be movable to advance and retreat into and out of contact with a portion of the wheel lying in the plane of the adjacent rim for measuring the displacement of the plane from a predetermined portion of the machine. In addition, the automatic data input device includes means carried at the free end of the movable means which is positionable to generate an electric signal representative of the diameter of the wheel to be balanced. In addition, the automatic data input device includes means for entering signals representative of the weight of the wheel being balanced.

In general, it is an object of the invention to provide an improved data input device to be associated with a dynamic balancing machine.

It is another object of the invention to provide a data input device for automatically entering a plurality of parameter values in response to carrying out a single maneuver on the part of the operator.

It is yet another object of the invention to provide an automatic data input device in a dynamic balancing machine in which the spacing between the rims of a wheel can be simply derived from information automatically entered.

It is a further object of the invention to provide an automatic input device whereby the weight of a wheel to be balanced can be determined while the dynamic wheel balancing machine is at rest.

The foregoing and other objects of the invention will become more readily evident from the following detailed description of preferred embodiments when considered in conjunction with the drawings.

BRIEF DESCRIPTION OF THE DRAWING

FIG. 1 shows a diagrammatic perspective view of a dynamic wheel balancing machine equipped with means providing automatic data entry according to the invention;

FIG. 2 shows a diagrammatic perspective view, in enlarged detail, of an automatic data entry device for a dynamic wheel balancing machine according to FIG. 1;

FIG. 3 shows a diagram useful in explaining aspects of the operation of the invention;

FIG. 4 shows a diagrammatic perspective view of a sub-assembly according to the invention;

FIG. 5 shows a diagrammatic end view of FIG. 4;

FIG. 6 shows a diagram of parameters to be employed according to the invention;

FIG. 7 shows a diagrammatic perspective view of a sub-assembly of the dynamic balancing machine;

FIG. 8 shows a diagrammatic perspective view according to another embodiment of the invention; and FIG. 9 shows a diagrammatic perspective view according to a further embodiment of the invention.

DETAILED DESCRIPTION OF THE PREFERRED EMBODIMENT

As disclosed herein a data entry system has been provided in which the value of certain parameters can be directly measured and entered into the computer section 59 in a single operation while the weight of the wheel is being automatically determined. Then, using the weight as determined by the computer section 59, the remaining parameters can be developed using a series of equations employing moments.

As shown in FIG. 1 a dynamic wheel balancing machine 11 is diagrammatically shown to include a wheel bearing housing 12. A driveshaft 13 (FIG. 6) carries a wheel and tire assembly 14 hereinafter merely referred to as wheel 14 on one end while means are provided at the other end for driving the shaft.

Thus, as shown best in FIG. 4 a mounting plate 17 secured at one end to bearing housing 12 supports a drive motor 16 at its other end to dispose the axle of motor 16 in position whereby a drivebelt 18 serves to couple a pair of pulleys (shown in phantom lines) respectively on motor 16 and on the end of driveshaft 13.

Means supporting bearing housing 12 and driveshaft 13 comprises generally a base plate 19 and a pair of laterally spaced support brackets 21, 22 formed at their upper ends with an arcuate recess 21a, 22a for receiving the sidewall of bearing housing 12 nested therein. Housing 12 is secured thereto as by welding.

Each of brackets 21, 22 is formed with parallel sides disposed at an angle theta ($\theta$) to the vertical whereby the weight of a wheel can be determined with the machine in a static mode.

Each bracket 21, 22 includes a pair of spaced parallel semi-rigid legs 23, 24 whereby the upper portion of each bracket can move in its own plane slightly with respect to the lower portion of the bracket. The upper and lower bracket portions are divided by a slot 26 which leads into an opening 30 disposed intermediate legs 23, 24.

As shown herein, the circular openings 30 in brackets 21, 22 each include a cylindrical undersized plug 28 held therein by means of snap rings 29 on opposite sides of each bracket. Plugs 28 serve to prevent any undue movement of the upper portion of the brackets with respect to their lower portions and in the plane thereof.

A pair of strain gauges 31 carried on leg 23 cooperate with another pair of strain gauges 32 carried on leg 24 to form a bridge. As thus arranged movement of bearing housing 12 can cause each of legs 23, 24 to flex thereby generating a signal derived from strain gauges 31, 32 indicative of the degree of flexing.

The output from the flexing of brackets 21, 22 is represented respectively as $F_3$, $F_4$ in FIGS. 5, 6, 7. As shown in FIG. 5, outputs $F_3$, $F_4$ can (in a static mode) be converted to components of weight to be added together to determine the weight of the wheel being balanced. Thus, as shown in FIG. 5 the sine of the angle $\theta$ is $F_3$ or $F_4$ divided by the unknown weight value, such as:

$$\sin\theta = F_3/W_1 \text{ or } F_4/W_2 \text{ respectively.}$$

Thus, the weight factor detected at each bracket 21, 22 is derived from its reading $F_3$ or $F_4$ divided by the sine of the angle $\theta$.

The angle $\theta$ is that angle defined by a vertical line and the inclined side of bracket 21 or 22.

In order to protect brackets 21, 22 and their associated strain gauges from forces acting laterally thereon, (as could be caused by carelessly loading a wheel onto the driveshaft) an elongate substantially inelastic tendon 33 couples bracket 22 to a steel block 34 to form a fixed restraint against lateral movement of brackets 21, 22. Block 34 is secured to an elongate steel base pad 36.

Machine 11 includes suitable computing means therein represented by the computation section 59 for carrying out the calculations involved therein.

As shown in FIG. 2, means including wand assembly 40 automatically senses and enters information into section 59 of machine 11 pertaining to the diameter of a wheel to be balanced as well as the information designated by the letter "a" in FIG. 6 (representing the displacement from the adjacent bracket 21 to the plane defined by the rim of the wheel).

As thus arranged wand assembly 40 comprises a pair of guide elements 37, 38 for supporting a linear potentiometer 39 and for guiding an elongate sensing wand 41. The sensing wand 41 is prepared with a number of scribe marks therealong visually representing the displacement between the plane of the nearest rim of wheel 14 and the adjacent support bracket 21. Wand 41 is axially movable between retracted and advanced positions and by means of a spring 42 is urged to its retracted position.

Thus, a washer 45 fixed to wand 41 takes the thrust of one end of spring 42 while the stationary guide 38 takes the thrust of the other end of spring 42.

Wand assembly 40 further includes an elongate rod 43 coupled to a guide bracket 44 and journalled through guide element 37 into potentiometer 39 to move with axial movement of wand 41. Accordingly, as wand 41 is withdrawn to the right (as shown in FIG. 2) rod 43 will serve to advance a wiper along the linear potentiometer 39.

In addition, guide bracket 44 serves to support its associated end of sensing wand 41 as it is guided along a strip or guidetrack 46. Strip 46 mounted to the side of a guide block 47 serves to guide and support the left end (as shown in FIG. 2) of wand 41 during its movement between retracted and advanced positions.

Accordingly, by withdrawing sensing wand 41 to a point where its rim contactor 48 engages the rim of a wheel, the linear potentiometer 39 will send an electric signal to computing section 59 of machine 11.

Wand assembly 40 further includes means providing an electric signal to section 59 representative of wheel diameter, C. Thus, guide bracket 44 supports a rotary potentiometer 49 in a manner to dispose its wiper pin to rotate in axial alignment with rotation of sensing wand 41 to supply such signals to section 59 in response to positioning of radius arm 51. After arm 51 is positioned, the data from all potentiometers is gated into section 59 simply by operation of data entry button 59. By pushing button 58 the information sensed by the potentiometers will be switched or gated into computer section 59 by suitable known means.

The axis of rotation 52 of wheel 14 lies a predetermined distance 53 from the center of rotation of radius arm 51 (and sensing wand 41). The included angle $\phi$ between arm 51 and a line between its axis and the axis of wheel rotation is directly represented by the output of potentiometer 49. The wheel radius 56 can be derived using the cosine formula $a^2 = b^2 + c^2 - 2bc \cos\phi$, where b and c are each a side 51, 53 of the triangle shown in FIG. 3 and $\phi$ is the angle included between the two known sides 51, 53.

Thus, as shown in the arrangement of FIG. 6, some of the parameters to be employed in balancing a wheel include:

a—minimum rim displacement
b—rim spacing
C—rim diameter
d—adjacent moment arm (assuming the center of gravity to be in the midplane of the wheel)

Knowing the foregoing values and the forces detected at the support brackets 21, 22 by strain gauges 31, 32, in a static mode it becomes possible to detect the weight of the wheel to be used as an input employed in determining the amount and location of weight to be added to a wheel to balance same.

Knowing the values of a, b and C (FIG. 6) and the forces measured by the stain gauges at $F_3$ and $F_4$, the use of moments in the following series of relationships solves for "d", "b" and the wheel weight, W.

Determination of the weight of a wheel, derived in a static mode, uses the values detected by the strain gauges and represented as $F_3$ and $F_4$. Thus, the wheel weight equals the sum of the outputs $F_3$ and $F_4$ divided by sine $\theta$, as now to be described.

As shown in FIG. 5, the strain gauge brackets 21, 22 are constructed with parallel sloping side edges whereby the weight supported by same can be represented by the hypotenuse 57 of the right triangle shown in phantom lines. Knowing the angle $\theta$ and the value sensed at $F_3$ (or $F_4$) the value of the weight components $W_1$ or $W_2$ at $F_3$ or $F_4$, respectively, can be derived:

$$F_3/\sin\theta = W_1 \text{ and } F_4/\sin\theta = W_2 \qquad (1)$$

Thus, section 59 (using suitable computing means) serves to solve the relationships of equations (1) through (4) to obtain the unknown values.

$$W_1 + W_2 = wt \text{ (of wheel and tire assembly)} \qquad (2)$$

$$(F_4)(e) = (wt)(d) \text{ (taking moments about bracket 21)} \quad (3a)$$

$$(F_3)(e) + (wt)(d + e) = 0 \text{ (taking moments about bracket 22)} \quad (3b)$$

$$(F_4)(e + d) + (F_3)(d) = 0 \text{ (taking moments about c.g.)}$$

Using the two equations in (3b) serves to solve for the moment d.

As will be recognized by those skilled in the art, methods of performing algebraic calculations by computer means are well known. The programming language FORTRAN, for example, is often used with well-known computers for business and technical applications. As stated in H. L. Seeds, FORTRAN IV For Business and General Applications 1-2 (copyright 1975):

FORTRAN IV is the most modern version of the FORTRAN language. Programs in FORTRAN IV can be processed by virtually all modern computers, such as IBM S/360, S/370, 1130, and System 3 computers, Xerox, Burroughs, CDC, and Univac computers. These are virtually all third- and fourth-generation computers that can perform intricate manipulations unknown to earlier computers.

As disclosed herein means for directly entering electrical inputs representative of "a" and "C" have been provided for supplying input data to computer section 59 for carrying out and solving the above and following relationships. Further, having entered parameter "a" into the system and calculated the value of "d" (as explained above) the value of "b" can be determined by section 59 using the following equation:

$$d = a + b/2 \text{ (having measured a and calculated d)} \quad (4)$$

To determined the diameter of a wheel, best noted in FIG. 3, radius arm 51 is rotated until rim contactor 48 engages the lip of the rim of the wheel. At that position, arm 51 will have rotated the wiper in potentiometer 49 to provide an electrical value representative of angle $\phi$. Using the cosine formula noted above, the radius of the wheel can be determined by computer section 59 where b and c are each a known side of a triangle and $\phi$ is the angle defined between the two sides.

According to another embodiment of the invention as shown in FIG. 8, means for supporting bearing housing 12, driveshaft 13, wheel 14, and drive motor 16 in a manner whereby the weight of the wheel, shaft, etc. can be weighted while in a static condition comprises the mounting assembly 61. Assembly 61 includes a base plate 62 of rigid material adapted to be mounted in a vertical orientation onto a wheel balancing frame or base. Base plate 62 supports a pair of outwardly extending mounting brackets 63, 64 comparable to brackets 21, 22.

With a bearing housing of the type described with respect to reference numeral 12 secured to arcuate seats 66 it is readily evident that the total weight of the supported wheel and drive assembly will be carried by brackets 63, 64. Thus, the output of the strain gauges associated therewith serves to directly provide an output representative of the weight supported.

As thus arranged this information can be directly entered into the electronic computer section 59 of the machine.

According to another embodiment of the invention as shown in FIG. 9 a sensing assembly 140 for automatically entering the displacement "a" as shown in FIG. 6 and for entering electrical information representative of the diameter of the wheel comprises a radius arm 151 supported at an end of sensing wand 141. Arm 151 carries a rim contactor 148 at its outer end. The sensing assembly 140 includes a base plate 135, a pair of upright supports 137, 138 disposed in axially spaced relation. Journal bearings 147 carried by supports 137, 138 serve to support wand element 141 for rotational and longitudinal movement.

Means serving to determine the longitudinal movement of wand element 141 at such time as rim contactor 148 engages the rim of a wheel comprises a potentiometer 142 having a rotatable stem element 142a. Element 142a is coupled to a spring-loaded spool 146 wrapped with a cable 152. Its free end is coupled to the left hand end of sensing wand element 141 by suitable fastening means 153.

As thus arranged, as wand element 141 is moved between retracted and advanced positions cable 152 rotates the wiper of potentiometer 142 to provide a varying voltage input representing varying displacements of wand element 141.

As described above, rotational movement of radius arm 151 generates a voltage input to computer section 59 from the changing state of potentiometer 149. After contactor 148 has engaged the lip of the adjacent rim, switch means can be activated such as by button 58 or other means for gating the information from potentiometers 142, 149 into computer section 59 to serve as inputs for the computations noted above.

From the foregoing it will be readily evident that there has been provided an improved wheel balancing machine and system wherein the human error usually experienced with respect to the taking of measurements and entering information into the computer portion of the machine has been reduced to a bare minimum. Thus, the operator of the machine is only required to draw sensing wand 41 toward the wheel and contact the rim with the outer end of radius arm 51. Data thus measured (as to "a" and "C") at that point is entered into the system automatically simply by pressing data entry button 58 which serves to gate the signals from potentiometers 38, 49 into the computation section 59 of machine 11.

As thus arranged, the apparatus as described introduces a substantial reduction in manual manipulation and observation so as to reduce human error involved in making the above data entries and the computations which provide parameters as noted in FIG. 6.

While it has been assumed that the center of gravity of the wheel lies in the midplane of the wheel, where the center of gravity is not so located the value of "d" above will need to be modified accordingly.

We claim:

1. In a dynamic wheel balancing machine of a type having an elongate drive shaft for carrying a wheel at one end to be rotated therewith, an automatic data input device for detecting data for balancing a wheel, said input device comprising, in combination:

measurement means axially movable between retracted and advanced positions with respect to the plane of the adjacent rim of the wheel for measuring the displacement between said plane and a predetermined portion of said machine;

engaging means carried at the free end of said measurement means positionable to engage the rim of the wheel;

signal means coupled to the engaging means to generate an electric signal representative of the diameter of the wheel to be balanced, said signal means including (1) a radius arm carried on the free end of said axially movable means, said arm being rotatable to engage the lip of the rim of the wheel and (2) variable electric means coupled to sense radial rotation of said arm to define an angle between said arm when contacting the rim of the wheel and a line drawn between the axis of rotation of the wheel and the axis of rotation of said radius arm.

2. In a dynamic wheel balancing machine having a frame and an elongate drive shaft for carrying a wheel on one end of the drive shaft to be rotated therewith, support means for rotatably supporting said shaft comprising, in combination:

first and second semi-rigid support members for carrying said support means, said support members being spaced along said shaft, each of said support members being mounted on said frame, disposed at an angle to the vertical, and supporting said shaft and wheel;

a strain gauge carried by each of said support members for providing an electrical signal representative of the stress applied to said first and second support members; and computer means interconnected with said strain gauges for receiving said electrical signals and thereby calculating the weight of said wheel while said shaft and wheel are in a static mode and calculating the forces acting on said wheel while said shaft and wheel are in a dynamic mode.

3. In a dynamic wheel balancing machine according to claim 2 in which said support members comprise support brackets, each said bracket including parallel semi-rigid legs disposed at an angle to the vertical to permit the weight of a wheel to be transferred thereto and form a moment related thereto while in a static mode.

4. In a dynamic wheel balancing machine of a type having a frame, means for rotating a wheel to be balanced, and computing means for (1) carrying out calculations, (2) determining the value of a radius of said wheel, and (3) determining the distance between said wheel and said dynamic balancing machine based on the values of inputs supplied thereto, said wheel having a periphery and an axis of rotation, input means for producing inputs to said computing means comprising, in combination:

an elongate arm extending between said periphery of said wheel and a point located at a predetermined distance from said axis of rotation, said elongate arm defining a first side of a triangle and said predetermined distance defining a second side of a triangle, and said first and second sides defining an angle of said triangle;

slide means for pushing said elongate arm a measurable distance so that said elongate arm rests in contact with said wheel; and sensing means carried by said frame for sensing the value of said angle and said measurable distance and for transmitting signals representative of said values as said inputs to the computing means.

5. In a dynamic wheel balancing machine comprising an elongate drive shaft for carrying a wheel on one end of the shaft to be rotated therewith, support means for rotatably supporting said shaft comprising, in combination:

first and second semi-rigid support members for carrying said drive shaft, each of said support members being disposed at an angle to the vertical to cause a related portion of the weight of said drive shaft and wheel to be transferred thereto and form a related moment therewith;

a strain gauge carried by each of said support members for providing information representative of its related portion of (1) the weight of said wheel while in a static mode, the sum of said related portions substantially defining the weight of the wheel and (2) the dynamic forces acting upon said wheel while in a dynamic mode; and computer means interconnected with said strain gauges for receiving said information and thereby calculating the weight of said wheel while said shaft and wheel are in a static mode and calculating the forces acting on said wheel while said shaft and wheel are in a dynamic mode.

6. In a dynamic wheel balancing machine of a type having a frame, means for rotating a wheel to be balanced, said wheel having two rims and a diameter, and computing means for carrying out calculations to derive the value of the spacing between the rims of said wheel, input means for providing inputs to said computer means comprising, in combination:

means for sensing first and second forces, respectively representative of first and second portions of the weight of the wheel detected at first and second spaced positions along the shaft, the sum of said first and second portions of the weight of the wheel being substantially equal to the total weight of said wheel;

means for detecting a displacement between one of said positions and the adjacent flange of the wheel; and signal means for providing to said computer means an electrical signal representative of said first and second forces and said displacement to said computer means.

7. A dynamic balancing machine for use with a wheel having two rims comprising, in combination:

a frame;

an elongate drive shaft for carrying said wheel on one end;

an elongate bearing housing for containing and supporting said elongate drive shaft;

two semi-rigid support members, mounted a predetermined distance from each other at an acute angle on said frame, for supporting said elongate bearing housing, each of said support members including a strain gauge for producing an electrical signal representative of forces applied to said support members;

motor means, interconnected with said drive shaft, for rotating said drive shaft and said wheel on said one end of said drive shaft; and computing means for receiving said electrical signal and computing a distance from (a) one of said support members to (b) a plane substantially mid-way between said two rims of said wheel.

8. The dynamic balancing machine as claimed in claim 7 further comprising measuring means for determining the distance between said dynamic balancing machine and one of said rims of said wheel.

9. A dynamic balancing machine as claimed in claim 8 wherein said computing means determines a distance between said rims of said wheel.

10. A dynamic balancing machine as claimed in claim 9 wherein said measuring means comprises, in combination:
- slide means axially movable between retracted and advanced positions with respect to said one of said rims of said wheel; and
- indicator means, coupled to said slide means, for generating an electric signal representative of said distance between said dynamic balancing machine and said one of said rims of said wheel.

11. A dynamic balancing machine as claimed in claim 10 wherein:
- said wheel has a periphery and a diameter;
- said slide means includes a rotatable arm movable to a position in which it contacts said periphery;
- said indicator means generates an electric signal representative of said position of said rotatable arm; and
- said computing means calculates said diameter of said wheel.

* * * * *